(12) United States Patent
So

(10) Patent No.: US 6,477,309 B2
(45) Date of Patent: Nov. 5, 2002

(54) TEMPERATURE-COMPENSATING ARRANGEMENTS AND METHODS FOR OPTICAL FIBER

(75) Inventor: Vincent So, Ottawa (CA)

(73) Assignee: BTI Photonics Inc., Ottawa (CA)

( * ) Notice: Subject to any disclaimer, the term of this patent is extended or adjusted under 35 U.S.C. 154(b) by 51 days.

(21) Appl. No.: 09/802,905

(22) Filed: Mar. 12, 2001

(65) Prior Publication Data

US 2002/0146230 A1 Oct. 10, 2002

Related U.S. Application Data

(60) Provisional application No. 60/211,180, filed on Jun. 13, 2000.

(51) Int. Cl.[7] .................................................. G02B 6/34
(52) U.S. Cl. ........................................................ 385/137
(58) Field of Search ................................ 385/136, 137, 385/134, 135, 138, 139, 140, 37

(56) References Cited

U.S. PATENT DOCUMENTS 5,509,952 A * 4/1996 Moore et al. .................. 65/406
5,694,503 A * 12/1997 Fleming et al. ................ 385/37
6,044,189 A    3/2000 Miller ........................... 385/37

FOREIGN PATENT DOCUMENTS

EP    WO 01/42838    * 6/2002    ............ G02B/6/34

OTHER PUBLICATIONS

"A Novel Negative Expansion Substrate Material for Athermalizing Fiber Bragg Gratings", D.L. Weidman, et al., 22nd European Conference on Optical Communication—ECOC'96, Oslo, pp. 1.61 to 1.64.

"Passive temperature–compensating package for optical fiber gratings", G.W. Yoffe, et al., Oct. 20, 1995, vol. 34, No. 30, Applied Optics, pp. 6859 to 6861.

"White Papers: Zero–Wavelength Shift Temperature Stabilized Multi–FBG Package", J.J. Pan, et al., www.e-tek.com/products/whitepapers/oecc98b/oecc98b.html, printed on May 28, 2000, pp. 1 to 5.

* cited by examiner

Primary Examiner—Brian Sircus
Assistant Examiner—Michael C. Zarroli

(57) ABSTRACT

A temperature-compensating package for an optical feature such as a fiber grating, a fiber arrangement suitable for use in such a temperature compensating arrangement, methods of manufacture for such packages and arrangements, and methods of temperature compensating an optical feature such as a fiber grating are provided. A precise temperature compensating arrangement can be provided by adjusting the length of two sections of material for any fiber. The arrangement has a first material having a positive coefficient of thermal expansion and a second portion made of a second material having a negative coefficient of thermal expansion, the first and second portions being arranged to form an end-to-end arrangement such that a selected combined coefficient of thermal expansion for the fiber holder results.

21 Claims, 3 Drawing Sheets

TEMPERATURE-COMPENSATING ARRANGEMENTS AND METHODS FOR OPTICAL FIBER

RELATIONSHIP TO PRIOR APPLICATION

This application claims the benefit of U.S. provisional application No. 60/211,180, filed Jun. 13, 2000.

FIELD OF THE INVENTION

The invention relates generally to optics systems (including communications) and optical waveguides and more particularly to the temperature compensation of optical fibers and component/features fiber Bragg gratings.

BACKGROUND OF THE INVENTION

Fiber Bragg gratings (FBG) have become important components in optical communications systems. FBG are formed by holographic exposure of photosensitive fiber to ultraviolet light, which creates a permanent refractive index grating along the core. The sharp reflection resonances are applied in DWDM (Dense Wavelength Division Multiplex) communication systems. These applications demand that the FBG wavelength does not change with temperature. Unfortunately FBG typically display variations in grating wavelength over temperature of about 0.01 nm/deg C., caused primarily by changes in the refractive index of the fiber, with an additional small contribution from the thermal expansion of the fiber. These coefficient of thermal expansions are clearly undesirable for the narrow channel spacings being used in DWDM systems.

Various methods have been devised for providing temperature independence for the FBG wavelength. These methods range from active systems, which utilize feedback to monitor and dynamically control certain parameters, to passive devices which utilize the thermal characteristics of materials to control the sensitivity of the FBG wavelength to temperature. Passive devices are more desirable since they are much simpler and require no power source. The FBG wavelength is determined by the index of refraction of the fiber and the spacing of the grating, both of which change with temperature. The index of refraction dominates in the sensitivity of wavelength to temperature. However, since the index of refraction is not easily controlled, passive temperature compensation devices generally operate by controlling the elongation with temperature of the optical fiber containing the FBG. This is usually accomplished by clamping the fiber containing the FBG into a mechanical structure made of materials having different, positive coefficient of thermal expansions of expansion. The structure is arranged such that different rates of expansion between the structural members supporting the fiber result in a negative elongation of the fiber with-increasing temperature. Typically the fiber is stretched at low temperature and is allowed to relax as temperature is increased. Examples of this method are described in U.S. Pat. No. 6,044,189 and the White paper "Zero-Wavelength Shift temperature Stabilized Multi-FBG Package" by J. J. Pan, S. X. Li, and Y. Shi in E-Tek Dynamics Inc. One disadvantage of the first method is that devices which are somewhat large may be required. Also, such a method may result in bending of the fiber. Bending may introduce undesirable effects such as broadening of the reflection peak, and fiber fatigue. Such frequent bending of the fibers may also cause reliability issues.

Another passive method of temperature compensation involves attaching the fiber containing the FBG to a material having the desired negative coefficient of thermal expansion, such as adopted by Corning and described in a paper presented at the 22nd European Conference (1996) on Optical Communication in Weidman et. al. entitled "A Novel Negative Expansion ubstrate Material for Athermalizing Fiber Bragg Gratings". A disadvantage of this method (the single-material approach) is that it requires very careful control of the formulation of materials to obtain the desired negative coefficient of thermal expansion of expansion.

SUMMARY OF THE INVENTION

It is an object of the invention to obviate or mitigate one or more of the above-identified disadvantages.

Embodiments of the invention provide a temperature-compensating package for an optical feature such as a fiber grating, a fiber arrangement suitable for use in such a temperature compensating arrangement, methods of manufacture for such packages and arrangements, and methods of temperature compensating an optical feature such as a fiber grating.

Advantageously, in the fiber grating temperature compensating package, there is no bending of the fiber grating. There is no stringent requirement on coefficient of thermal expansion of the materials involved. Rather, a precise match can be accomplished by adjusting the length of two sections of material for any fiber. This may be important since typically two batches of fiber will have slightly different characteristics.

According to one broad aspect, the invention provides a fiber holder comprising a first portion made of a first material having a positive coefficient of thermal expansion and a second portion made of a second material having a negative coefficient of thermal expansion, the first and second portions being arranged to form an end-to-end arrangement such that a selected combined coefficient of thermal expansion for the fiber holder results.

The fiber holder may be adapted to cause a change in a length of fiber as a function of temperature which compensates for a change in index of refraction of the length of fiber as a function of temperature. Typically, the fiber holder has a mechanism for imposing a change in a length of fiber as a function of a change in length of the fiber holder. For example, the fiber holder in one embodiment has a longitudinal groove in the end-to-end arrangement of the first and second portions for receiving a fiber.

To hold the fiber in place, the holder may have two opposed surfaces, one surface being in said first portion, the other surface being in said second portion, and adapted to hold a fiber under tension between the two opposed surfaces.

The fiber may have a feature thereon which has a change in behavior as a function of temperature due to changes in the index of refraction of the fiber which requires compensation. The feature in one embodiment is a fiber grating, such as a fiber Bragg grating.

According to another broad aspect, the invention provides a fiber assembly having a first fiber portion with a first cover followed by a second fiber portion without a cover followed by a third fiber portion with a second cover, a first ferrule fixed at one end of the second fiber portion, and a second unfixed ferrule on the second fiber portion. This assembly is suitable for installation on the above-discussed fiber holder.

Another broad aspect provides a method of making a fiber assembly which begins with the provision of two fibers. A cover portion is removed from an end of each of the two fibers to expose two uncovered portion. Two ferrules are placed on the uncovered portions. The uncovered portions are fused together to produce the second fiber portion. Finally, one of the ferrules is fixed in place at one end of the second portion.

The use of ferrules provides a good grip on the fiber, and introduces no birefringence and/or polarization dependent loss.

It is noted that this method is not limited to two materials. With two materials, the first order temperature effect of FBG can be eliminated. With more materials with different thermal coefficients, high order dependence can be compensated.

Another embodiment of the invention provides a stretchable optical transmission medium holder comprising a first portion made of a first material having a positive coefficient of thermal expansion and a second portion made of a second material having a negative coefficient of thermal expansion, the first and second portions being arranged to form an end-to-end arrangement such that a selected combined coefficient of thermal expansion for the stretchable optical transmission medium holder results.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
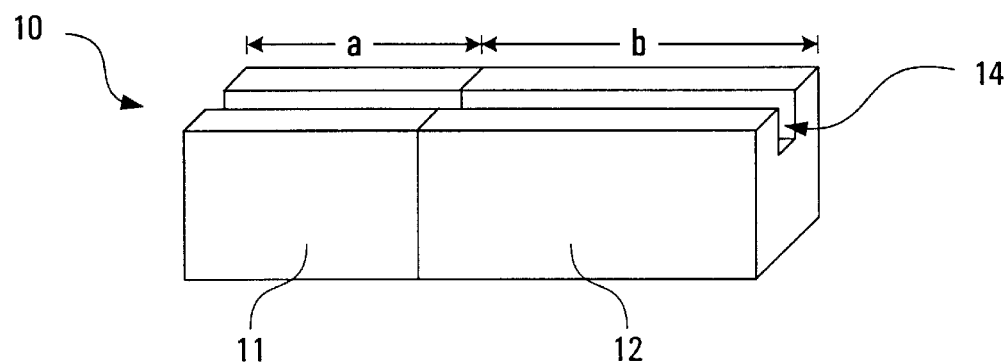
FIG. 1 is a perspective view of a fiber holder provided by an embodiment of the invention made up of two sections.

Referring to FIG. 1, an embodiment of the invention provides a fiber holder generally indicated by 10 which can be used to perform temperature dependence compensation for optical features on a fiber being held by the holder. One example of such a feature is a FBG (fiber Bragg grating). The holder 10 has two portions 11,12 arranged in an end-to-end configuration and held together, for example with epoxy. One portion 11 is made of a first material which has a positive coefficient of thermal expansion (fused quartz, BK7 glass, to name a few examples) and the other portion 12 is made of a second material which has a negative coefficient of thermal expansion (e.g. zirconium tungstate). The holder 10 has a groove 14 formed in the top surface which extends lengthwise along the entire length of the top surface. The groove 14 is wide enough to accommodate a bare fiber (a portion of a fiber with cladding removed, for example slightly wider than 125 microns. Similarly, the groove 14 is deep enough to accommodate the bare fiber, for example a few hundred microns deep. The groove 14 is long enough to contain a feature on the fiber which requires temperature compensation, for example a few centimeters long. A fiber which is installed in the groove 14 (as detailed by way of example below) has a refractive index which is a function of temperature, and changes in temperature will change the refractive index, and in turn change the behaviour of features formed on/in the fiber. The holder 10, and more particularly the length of the groove 14 will be a function of temperature, the particular function being determined by the ratio of the lengths of the two portions 11,12 and by the coefficients of thermal expansion of the two portions 11,12. The materials and lengths of the two portions 11, 12 are selected to result in a desired combined coefficient of thermal expansion which will compensate for the effect due to change in the refractive index of the fiber upon the FBG. More particularly, changes in the index of refraction change the optical path length of the fiber. Changes in the optical path length due to index of refraction change are compensated for by changing the physical path length.

Figure 2:
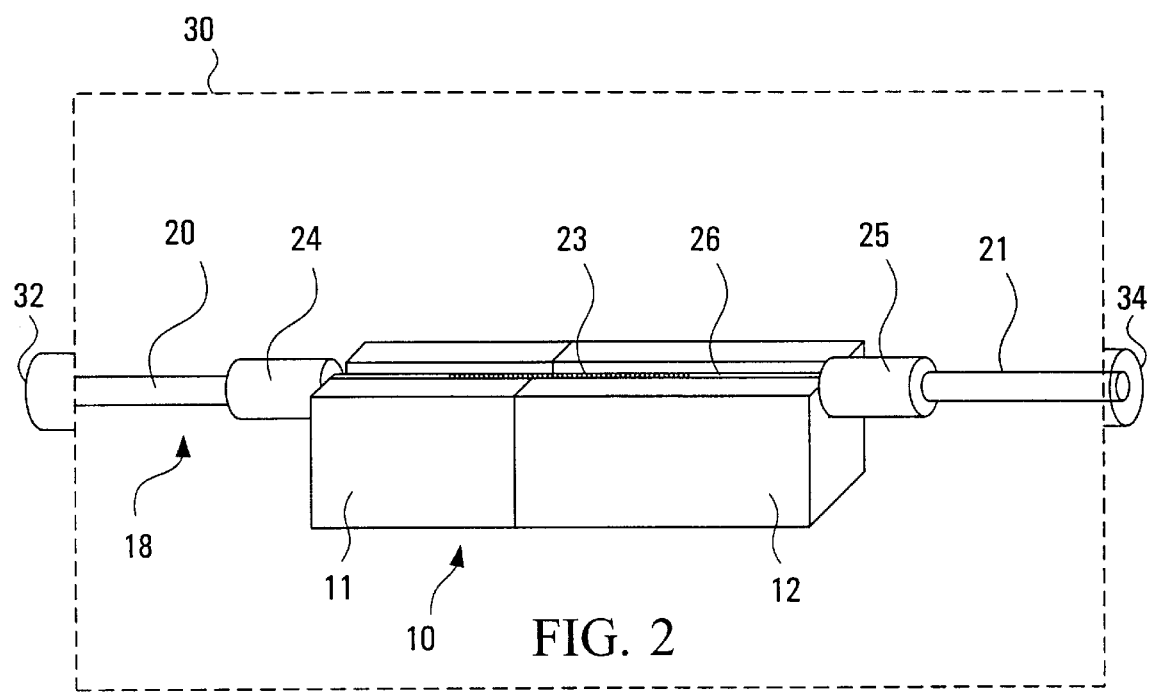
FIG. 2 shows the spliced fiber with a fiber grating assembly installed in the holder of FIG. 1.
Figure 3:
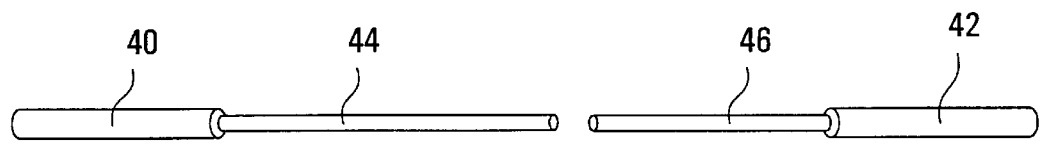
FIGS. 3–6 depict a method of making the fiber grating assembly of FIG. 2.

Referring now to FIG. 2, the holder 10 of FIG. 1 is shown with a fiber grating assembly 18 provided by another embodiment of the invention inserted into the groove 14. The fiber grating assembly 18 has two coated fiber portions 20,21, and an uncoated fiber portion 26 on which there is an optical feature such as a fiber gating 23, for example a fiber Bragg grating. There are two ferrules 24,25 at opposite ends of the uncoated portion 26. The uncoated portion 26 is shown placed in the groove 14. By appropriately spacing the ferrules 24,25, an initial tension is applied to the uncoated fiber portion 26. This may achieved for example by making the fiber grating assembly 18 with one of the ferrules (for example ferrule 24) fixed in place, and leaving the other ferrule 25 free. Then, the required tension is applied, for example through the use of a tension gauge. The tension is applied such that at the temperature at which the installation is being conducted, the appropriate stretching of the fiber results which compensates for any change in the index of refraction in the fiber at that temperature. After appropriate tension is applied to the fiber grating assembly 18 and while still under tension, the second ferrule 25 is moved against the remaining end of the holder 10 and held in place, for example with epoxy.

Preferably, the entire arrangement of FIG. 2 is contained in a package 30 which a external connector 32,34 at opposite ends of the fiber grating assembly 18. Any suitable external connector type may be used. Alternatively, a package may be provided which simply has the fibers extending out of the package for splicing. The entire arrangement provides a self-contained temperature compensated device.

Figure 4:
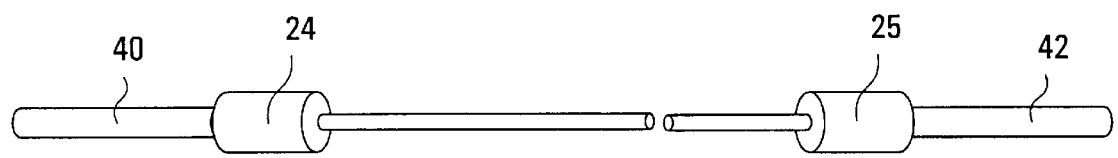

Referring now to FIGS. 3–6, a method of making the fiber grating assembly 18 will be described. The method starts with two coated fibers 40,42. The coatings at one end of each of two fibers are stripped exposing a respective portion of bare fiber 44,46 in each fiber 40,42 (see FIG. 3). Next, as shown in FIG. 4, ferrules 24,25 are inserted into the fiber. One of the ferrules 24 is fixed in place on the first fiber 40, for example by epoxy, and the other ferrule 25 is allowed to remain free to slide along the uncoated portion of the second fiber 42.

Figure 5:
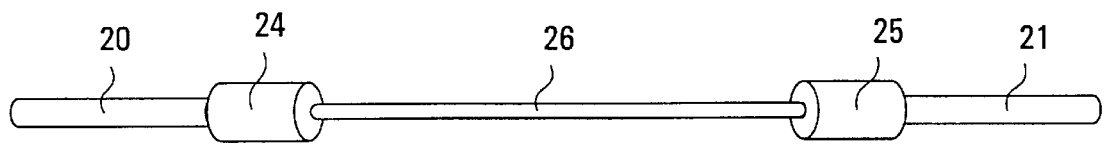

Next, as shown in FIG. 5, the two ends of the exposed bare portions 44,46 of the two fibers are joined together, for example by fusion splice. After fusion (see FIG. 5), the length of bare fiber 26 of FIG. 1 results. The coated portion of the first fiber 40 becomes coated portion 20 of FIG. 1, and the coated portion of fiber 42 becomes the coated portion 21 of FIG. 1. The length of the exposed fiber portion 26 after fusion should nominally be similar to the length of the holder 10 of FIG. 1.

Figure 6:
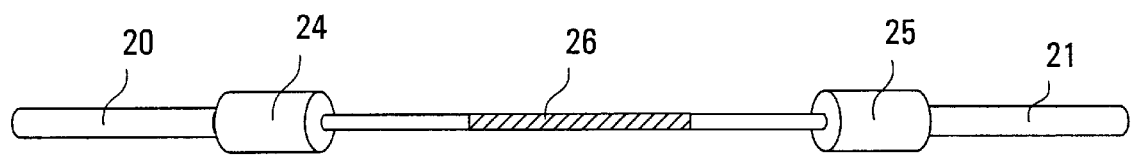

Next, referring to FIG. 6, a feature is formed, such as a fiber grating 23, such as an FBG written onto the fiber by any suitable method, standard otherwise. Alternatively, some other feature requiring temperature compensation may be provided. The arrangement of FIG. 6 is ready to be installed in the holder 10 as described previously.

THEORY OF THE INVENTION

The Bragg wavelength of a grating is given by $$\lambda = 2\Lambda n \quad (1)$$

where $\lambda$ is the wavelength of light to be reflected, $\Lambda$ is the period of the grating, and $n$ is the effective refractive index of the fiber. The change of Bragg wavelength with temperature is then expressed by:

$$\frac{d\lambda}{dT} = 2n\frac{d\Lambda}{dT} + 2\Lambda\frac{dn}{dT} \quad (2)$$

In order that there is no change in the Bragg wavelength with temperature (i.e. $d\lambda/dT=0$), the following condition should be satisfied to some degree:

$$\frac{1}{\Lambda}\frac{d\Lambda}{dT} = -\frac{1}{n}\frac{dn}{dT} \quad (3)$$

i.e. the period of the grating must satisfy Equation (3). This can be achieved if the fiber grating is attached to a holder such as described above, and the holder has the thermal expansion coefficient $$-\frac{1}{n}\frac{dn}{dT} \quad (4)$$

Even though it is feasible to custom design a material to this thermal expansion coefficient, according to the invention, at least two different materials are used—one with negative thermal expansion coefficient ($T_A$) less than $$-\frac{1}{n}\frac{dn}{dT}$$

and the other with positive thermal expansion coefficient ($T_B$). The lengths of portions 11,12, referred to as L1,L2 respectively are in the ratio of a:b=L1/(L1+L2):L2/(L1+L2), such that $$aT_A + bT_B = -\frac{1}{n}\frac{dn}{dT} \quad (5)$$

Then the total structure (L1+L2) will have the thermal expansion coefficient that will keep the Bragg wavelength of the FBG somewhat constant (at least to the first order of approximation) with temperature.

In an example implementation, the negative thermal expansion material is 80% of the total length and is about 4 cm in length. The positive thermal expansion material is the remaining 20% of the length, about 1 cm in length. Preferably, dimensions are accurate to about 1 mm.

The described fiber holding arrangement (of FIG. 6) can be used with a holder made of only one material. However, as indicated above, it is difficult to get the required expansion characteristics to match a given batch of fiber.

Figure 7:
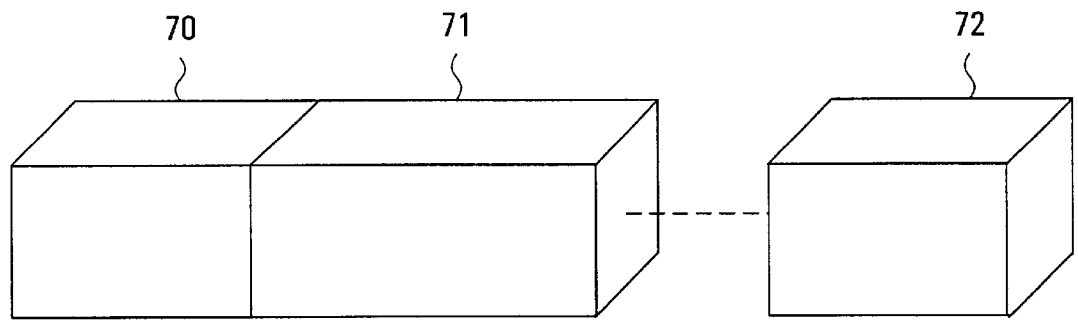
FIG. 7 is a perspective view of a fiber holder provided by another embodiment of the invention made up of three or more sections.

In another embodiment of the invention, a holder is formed using more than two materials each having differing coefficients of thermal expansion. This allows higher order temperature dependencies to be compensated. An example of this is shown in FIG. 7 where portions 70,71,72 and possibly additional portions are arranged lengthwise. Further, it is to be noted that a larger number of portions each made of only one of two materials may be used, but effectively all of the portions made of the same material are equivalent to a single portion having the a cumulative size equal to the sum of the pieces.

In the illustrated example, the two portions 11,12 form a cuboid arrangement. More generally, any arrangement of two portions which provides for an additive overall coefficient of thermal expansion is suitable. Preferably, the portions are arranged in a manner which results in a purely axial force (i.e. one which introduces no bending) on the fiber installed therein.

In the illustrated example, a groove is used to hold the fiber in place. More generally any suitable mechanism for tieing the length of a portion of the fiber to a length of the holder or a portion of the holder may be employed. For example, epoxy may be used to glue the fiber to the ends of the holder.

In the illustrated example, temperature compensation is being performed for a feature on a fiber, and more particularly for a fiber grating.

In another embodiment, the arrangement of FIG. 1 can be used to perform temperature compensation for optical transmission media other than fibers, for example waveguides assuming they are designed with sufficient longitudinal stretchability.

Numerous modifications and variations of the present invention are possible in light of the above teachings. It is therefore to be understood that within the scope of the appended claims, the invention may be practised otherwise than as specifically described herein.

I claim:

1. A fiber holder comprising a first portion made of a first material having a positive coefficient of thermal expansion and a second portion made of a second material having a negative coefficient of thermal expansion, the first and second portions being arranged to form an end-to-end axially in contact arrangement such that a selected combined coefficient of thermal expansion for the fiber holder results.

2. A fiber holder according to claim 1 adapted to cause a change in a length of fiber as a function of temperature, the change in length of the fiber compensating for a change in index of refraction of the length of fiber as a function of temperature.

3. A fiber holder according to claim 1 further comprising means for imposing a change in a length of fiber as a function of a change in length of the fiber holder by applying a strictly axial force to the length of fiber.

4. A fiber holder according to claim 1 further comprising a longitudinal groove in the end-to-end arrangement of the first and second portions for receiving a fiber.

5. A fiber holder according to claim 1 wherein the holder has two opposed surfaces, one surface being in said first portion, the other surface being in said second portion, and adapted to hold a fiber under tension between the two opposed surfaces.

6. A fiber holding arrangement according to claim 1 further comprising a longitudinal groove in the end-to-end arrangement of the first and second portions for receiving a fiber having a feature thereon, the feature exhibiting a change in behaviour as a function of temperature due to changes in the index of refraction of the fiber, the length of the groove being at least as long as the feature.

7. A fiber holder according to claim 6 wherein the feature is a fiber grating.

8. A fiber holder according to claim 7 wherein the fiber grating is a fiber Bragg grating.

9. A fiber holder according to claim 8 wherein the grating has a Bragg wavelength given by $$\lambda = 2\Lambda n$$

where $\lambda$ is a wavelength of light to be reflected, $\Lambda$ is the period of the grating, and n is an effective refractive index of the fiber, the holder having a collective coefficient of thermal expansivity given by:

$$-\frac{1}{n}\frac{dn}{dT}$$

satisfied by having lengths of the two components satisfied by defining their lengths L1,L2 such that the ratio a:b, L1/(L1+L2):L2/(L1+L2), satisfies $$aT_A + bT_B = -\frac{1}{n}\frac{dn}{dT}$$

where $T_A$ is the thermal expansion coefficient of the portion of length L2, and $T_B$ is the thermal expansion coefficient of the portion with length L2.

10. A fiber holder according to claim 3 wherein the fiber has a feature thereon, the feature exhibiting a change in behavior as a function of temperature due to changes in the index of refraction of the fiber, wherein the first portion has a first length, and the second portion has a second length, and the first and second lengths are selected to compensate for the feature's change in behavior as a function of temperature or to customize a temperature response of the feature.

11. A fiber holder according to claim 1 further comprising at least one additional portion, each additional portion having a respective coefficient of thermal expansion, whereby by suitable selection of lengths of each of the first, second and at least one additional portions higher order temperature compensation can be achieved.

12. A temperature compensated fiber arrangement comprising:
 a fiber holder comprising a first holder portion made of a first material having a positive coefficient of thermal expansion and a second holder portion made of a second material having a negative coefficient of thermal expansion, the first and second holder portions being arranged end-to-end such that an end-to-end arrangement with a combined coefficient of thermal expansion results;
 a length of fiber;
 a holding mechanism adapted to hold the length of fiber with respect to the holder so as to cause a change in the length of fiber equal to a change in length of the fiber holder which compensates for a change in index of refraction of the length of fiber as a function of temperature.

13. An arrangement according to claim 12 wherein the holding mechanism comprises:
 a longitudinal groove in the end-to-end arrangement of the first and second holder portions for receiving a fiber; and
 ferrules applied to the length of fiber such that the length of fiber is held under tension within the longitudinal groove.

14. An arrangement according to claim 13 wherein the fiber has a feature thereon, the feature exhibiting a change in behaviour as a function of temperature due to changes in the index of refraction, the length of the groove being at least as long as the feature.

15. An arrangement according to claim 14 wherein the feature is a fiber grating.

16. An arrangement according to claim 14 wherein the grating is a fiber Bragg grating.

17. An arrangement according to claim 14 wherein the first holder portion has a first length, and the second holder portion has a second length, and the first and second lengths are selected to compensate for the feature's change in behavior as a function of temperature or to customize a temperature response of the feature.

18. An arrangement according to claim 12 further comprising an external housing containing the fiber assembly and the fiber holder.

19. An arrangement according to claim 18 further comprising two external connectors.

20. A method of making the arrangement of claim 12 comprising:
 providing the fiber holder;
 providing two fibers;
 removing a cover portion from an end of each of the two fibers to expose two uncovered fiber portions;
 placing first and second ferrules on the uncovered portions;
 fusing the two uncovered portions together to produce the second fiber portion;
 fixing the first ferrule in place at one end of the second portion;
 installing the second fiber portion in the longitudinal groove with the first ferrule against a first end of the longitudinal groove;
 applying tension proximal the second ferrule; and
 fixing the second ferrule in place against a second end of the longitudinal groove while still under tension.

21. A stretchable optical transmission medium holder comprising a first portion made of a first material having a positive coefficient of thermal expansion and a second portion made of a second material having a negative coefficient of thermal expansion,
 the first and second portions being arranged to form an end-to-end axially in contact arrangement such that a selected combined coefficient of thermal expansion for the fiber holder results.

* * * * *